(12) United States Patent
Goretta et al.

(10) Patent No.: US 6,403,018 B1
(45) Date of Patent: Jun. 11, 2002

(54) METHOD FOR FABRICATING CERAMIC COMPOSITES

(75) Inventors: Kenneth C. Goretta, Downers Grove; Dileep Singh, Naperville; Bryant J. Polzin, Downers Grove; Terry Cruse, Lisle; John J. Picciolo, Lockport, all of IL (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 09/489,983

(22) Filed: Jan. 21, 2000

(51) Int. Cl.⁷ .............................. B29C 47/06; B28B 5/00
(52) U.S. Cl. .................. 264/639; 264/642; 264/172.15; 264/250; 264/DIG. 19; 264/DIG. 26
(58) Field of Search ................... 264/639, 627, 264/DIG. 19, DIG. 26, 642, 172.15, 250

(56) References Cited

U.S. PATENT DOCUMENTS

| 4,010,233 | A | * | 3/1977 | Winter et al. ......... 264/DIG. 19 |
| 4,772,524 | A | * | 9/1988 | Coblenz ...................... 428/699 |
| 4,824,623 | A | * | 4/1989 | Rambosek ........... 264/DIG. 19 |
| 4,863,799 | A | * | 9/1989 | Mininni et al. ................ 501/95 |
| 5,645,781 | A | * | 7/1997 | Popovic' et al. ............. 264/639 |
| 5,705,122 | A | * | 1/1998 | Curran ........................ 264/627 |
| 5,783,139 | A | * | 7/1998 | Curran ........................ 264/627 |

* cited by examiner

Primary Examiner—James Derrington
(74) Attorney, Agent, or Firm—Cherskov & Flaynik

(57) ABSTRACT

A method for producing composite ceramic material is provided wherein a core ceramic structure is produced and simultaneously enveloped with a sleeve of similar material.

17 Claims, 3 Drawing Sheets

METHOD FOR FABRICATING CERAMIC COMPOSITES

CONTRACTUAL ORIGIN OF THE INVENTION

The United States Government has rights in this invention under Contract No. W-31-109-ENG-38 between the U.S. Department of Energy and the University of Chicago representing Argonne National Laboratory.

BACKGROUND OF THE INVENTION

1. Field of the Invention

The present invention relates to a method for fabricating composite ceramic structures, and more particularly, the present invention relates to a method for fabricating multiphase ceramic filaments to be used as building blocks for the structures.

2. Background of the Invention

When monolithic ceramic structures are stressed to the point of failure, they often fail with little or no warning, i.e., catastrophically. These monolithic ceramics simply load elastically to a maximum stress and then fail all at once.

Several techniques for improving the toughness of ceramic structures have been attempted. For example, fibers have been added to bulk ceramic material to increase its toughness. These are called continuous fiber ceramic composites. However, even these tougher materials can fail catastrophically.

Attempts have been made at forming ceramic structures which fail "gracefully" (i.e., with warning). One of these structures are known as fibrous monoliths (FMs), and are fabricated from billets comprising a composite ceramic containing both a strong cellular phase (a core) surrounded by a phase (in the form of a sleeve) designed to dissipate energy during fracture. Current FM production processes utilize multi-step protocols and heterogeneous materials. These processes make use of ram extrusion of slugs, and are thus batch processes by definition.

U.S. Pat. No. 4,772,524 awarded to Coblenz on Sep. 20, 1988 discloses a fibrous monolith whereby a cotton thread runs co-axially with the monolith produced. U.S. Pat. No. 5,645,781 awarded to Popovic et al. on Jul. 8, 1997 discloses a method for clamping or wrapping a sleeve of ceramic material around a dense core of ceramic material. These processes require separate steps and are thus considered "batch" operations.

Another drawback to current FM production processes is that hot pressing (often in an inert atmosphere) is generally used to densify the materials after their formation. To date, hot pressing in an inert atmosphere has been used to densify FMs such as silicon nitride (cell)/boron nitride (cell boundary) systems and diamond-cobalt (cell)/cobalt (cell boundary) systems. These FMs have been made from thermoplastic co-polymer blends that also require special processing during extrusion, such as close control of pressure and need for use of elevated temperatures above 160° C. Hot pressing limits the shapes of the FMs that can be produced. Also, this process is costly.

A need exists in the art for a process for producing ceramic composites which utilize common extrusion equipment and similar phase materials. The process should produce a structure which yields gracefully. The process also should utilize common ceramic materials and sintering steps conducted in air and at ambient pressure to further minimize cost. Finally, the process should incorporate the least number of steps, and preferably comprise a single step or continuous process so as to expedite production in large industrial scale scenarios.

SUMMARY OF THE INVENTION

It is an object of the present invention to provide a method for producing ceramic composite materials that overcomes many of the disadvantages of the prior art.

Another object of the present invention is to provide a continuous process for producing ceramic composite material. A feature of the invented method is the use of a standard extrusion machine. An advantage of the invented method is that minimal fabricator training is required, resulting in an optimization of personnel and existing equipment, and ultimately lower costs.

Yet another object of the present invention is to provide a process for producing robust unidirectional or multidirectional fibrous monoliths. A feature of the invented method is careful matching of shrinkages and thermal-expansion coefficients of the various phases comprising the monoliths. An advantage of the invented method is the ability to sinter in air and at atmospheric pressure (i.e., pressure-less sintered) to produce the fibrous monoliths, thereby obviating the need for hot pressing in an inert atmosphere to accomplish densification. This leads to a reduction in cost of many FM parts by a factor of up to 100.

Still another object of the present invention is to provide a process for producing fibrous monoliths which are stable at a myriad of operating conditions. A feature of the process is the utilization of different particles sizes of the same compound for both the cell phase and the cell boundary layer. An advantage of the invented process is the elimination of material compatibility problems, thereby also eliminating diffusion between phases so as to permit operation at higher temperatures. Stability in oxidizing, inert and reducing temperatures also is realized.

Briefly, the invention provides for a method for producing composite ceramics, the method comprising simultaneously forming a ceramic core coaxial with a ceramic sleeve.

BRIEF DESCRIPTION OF THE DRAWINGS

These and other objects and advantages of the present invention will become readily apparent upon consideration of the following detailed description and attached drawing, wherein.

DETAILED DESCRIPTION OF THE INVENTION

A low-cost, highly optimized method for producing fibrous monoliths from duplex ceramic filaments is provided. Salient features of the invented method include the simultaneous formation and envelopment of a ceramic core phase with a ceramic sleeve phase. This simultaneous formation is the result of the continuous extrusion of FM filaments, including solid freeform fabrication, so as to achieve net-shape fabrication of FMs.

Generally, the core phase is relatively dense compared to the sleeve phase, the latter commonly referred to as the cell boundary phase.

The resulting duplex filaments represent a composite structure containing a strong continuous cellular phase surrounded by a second phase that is designed to dissipate energy during failure. This second or surrounding boundary phase has a non-brittle fracture characteristic to allow for gradual splitting and delamination.

Specifically, metal oxide-based fibrous monoliths (FMs) containing porous cell boundaries and dense cells were fabricated by their simultaneous extrusion subsequent and lay up of filaments. The resulting construct was subsequently sintered. Resulting bars of the material exhibited significant energy dissipation during fracture and retained some load to large displacements. The FM bars exhibited clear evidence of crack deflection and delamination.

Figure 1:
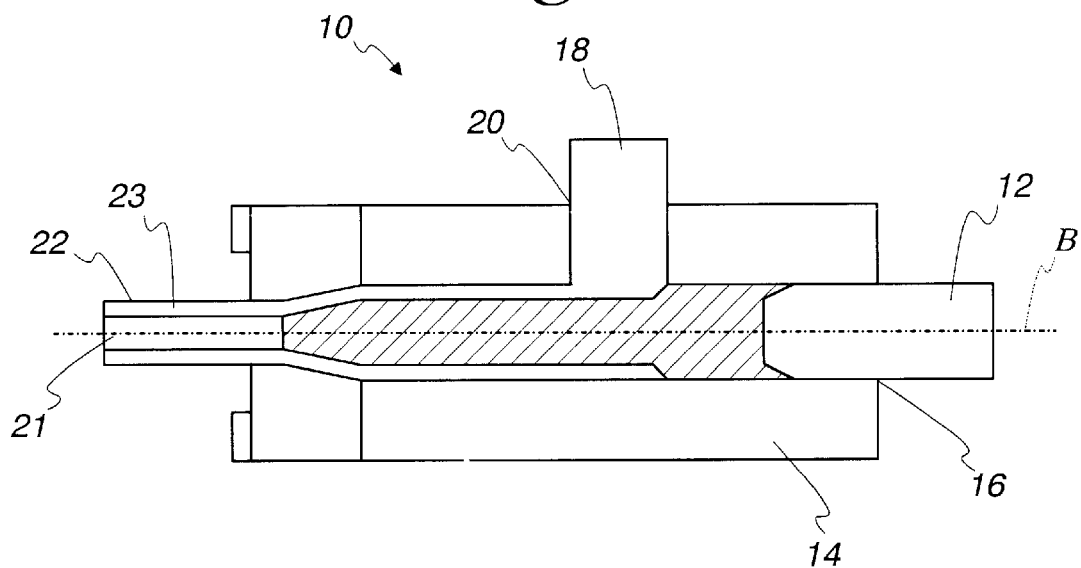
FIG. 1 is a schematic depiction of the invented co-extrusion process, in accordance with features of the present invention.
Figure 2:
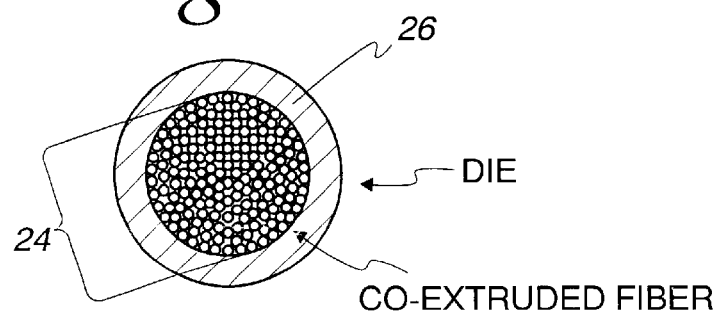
FIG. 2 is a schematic depiction of a process for producing unidirectional fibrous monoliths from the invented duplex filaments, in accordance with features of the present invention.
Figure 2:
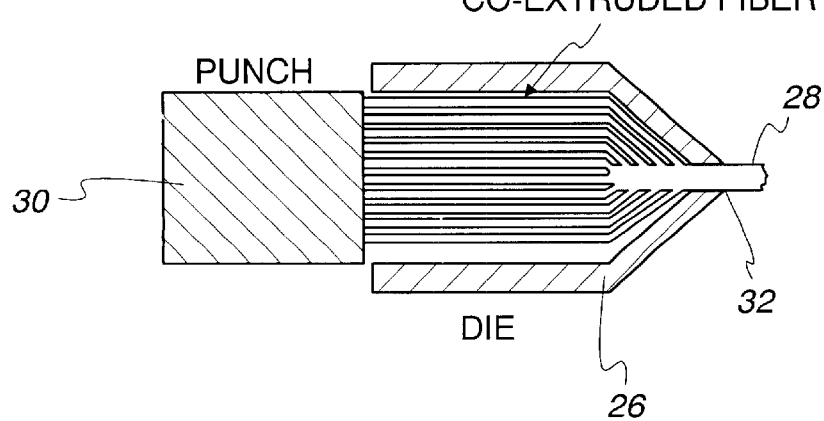

FIGS. 1 and 2 provide a schematic depiction of the process. The co-extrusion process, which produces the duplex filaments, is depicted as numeral 10 in FIG. 1. Cell material 12 from a screw extruder (not shown) enters the die 14 along the latter's longitudinal axis $\beta$. The cell material enters the die through a first injection port 16.

Simultaneous with the injection of the cell material, cell boundary material 18 from a second screw extruder (also not shown) enters the die 14 from a second injection port 20. A duplex filament 22 is produced having a cell or core 21 and a boundary phase 23. This aspect of the production process can be performed at room temperature, inasmuch as the plastic materials representing the injectable core and sleeve matter contain no thermoplastic materials that require heating to soften into a "workable" state. As such, the instant plastic materials are workable at room temperature.

These filaments 22 can be stored for up to several days. Ultimately, the filaments are formed into bundles 24. As depicted in FIG. 2, the filament bundle 24 is placed in an extrusion dye 26 and extruded to form unidirectional fibrous filaments 28. A punch 30 or similar device is utilized to force the bundle through the exit orifice 32 of the extrusion dye. The masses for coextrusion (both core and sleeve) produce initial torque values of 4–12 newton meters. The coextrusion process requires a force of 5 to 50 MPa, most commonly 10–40 MPa. The ram extrusion process requires a force of 10–50 MPa, most commonly about 15–28 MPa.

The resulting FM filaments 28 are then subjected to a lay up processes. In one lay up scenario, FM filament is first formed into sheets by, for example, sectioning the filament into lengths and arranging them side by side in a plate or bar die. Instead of side-by-side juxtaposition, the filaments can be serpentined along the plane in a die defining the sheet, or even patterned into a sheet in a solid free form fabrication. The lay up process is completed by stacking and shaping the sheets to form FM test specimens.

The structures were then sintered at temperatures ranging from approximately 1400° C. to 1600° C. for a time sufficient to achieve the desired density of the core phase and the porosity of the surrounding sleeve phase.

Figure 3:
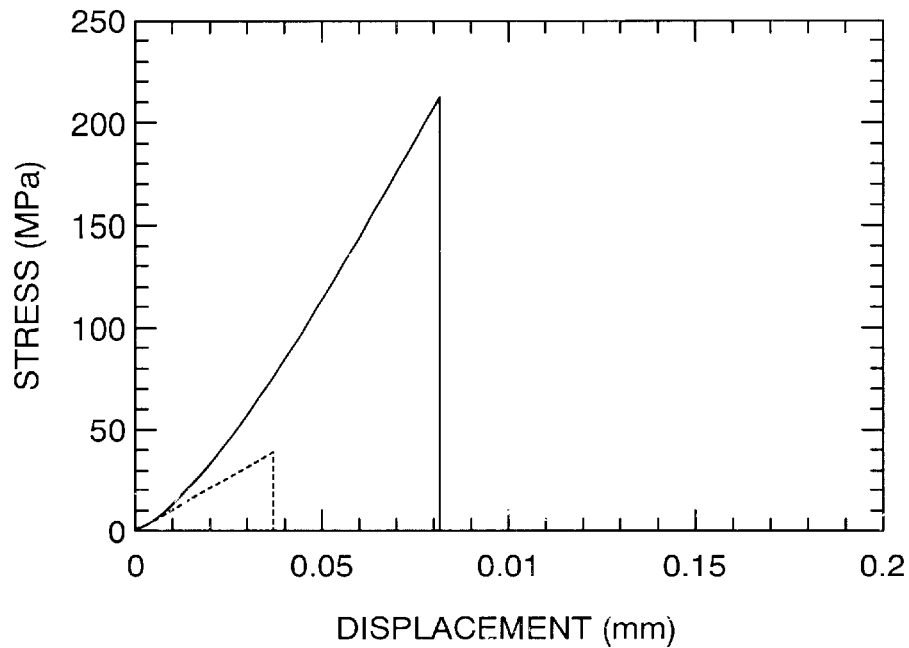
FIG. 3 is a stress v. displacement curve for typical monolithic ceramics.
Figure 4:
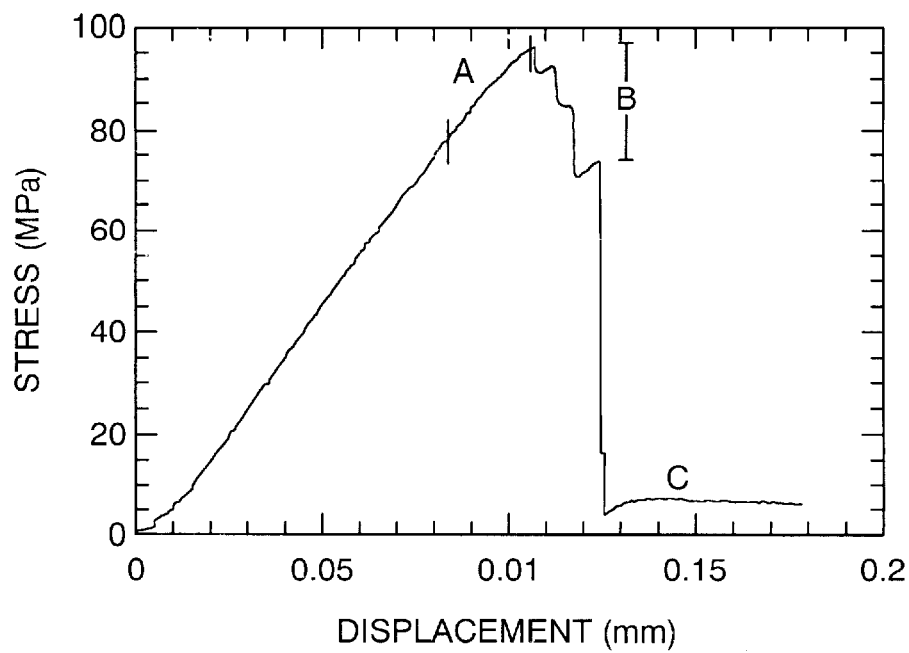
FIG. 4 is a stress v. displacement curve for a fibrous monolith produced from duplex filaments produced via the invented method, in accordance with features of the present invention.

Four point flexural tests were conducted on the cell material, cell-boundary material and FMs. FIG. 3 depicts the stress-displacement curves for the core material (solid line) and sleeve material (dotted line) before their combination to form a duplex filament. FIG. 4 depicts the stress-displacement curve for the FM which represents a combination of the core and sleeve material. Both the core material and the sleeve material, when tested separately, exhibited fast fracture at maximum stresses of approximately 220 MPa and 430 MPa, respectively.

FIG. 4 shows FM bars failing at higher strain (compared to the materials depicted in FIG. 3), as evidenced by the large area under its curve after the maximum load has been attained, and also as depicted by the jagged, downward curve between 0.1 mm displacement and 0.13 mm displacement. FIG. 4 shows three key features that provide the toughness characteristic of the FM material. The first feature is non-linearity prior to reaching maximum load. This feature is depicted in region A of FIG. 4 which shows a slight downward deviation of the curve or a slight weakening of the construct between 0.08 mm and 0.105 mm displacement. The bending illustrated in region "A" depicts the small scale fracturing, which is indicated by acoustical or thermal signature. Such signatures serve as a warning that the component stress should be decreased to avoid failure.

The second feature, designated as "B" is a series of unload/loading steps during crack propagation. This second feature represents an intermediate zone of fracturing of the construct, with splintering of the construct occurring more rapidly than that seen in the first phase (i.e. region "A") of failure.

The third feature of the invented FM is its retention of small load-carrying capability to very large strains. As depicted in region C of FIG. 4, some adherence remains in the construct, even after a precipitous drop in strength, so that approximately 5 to 7.5 MPa of yield is evident.

Figure 6:
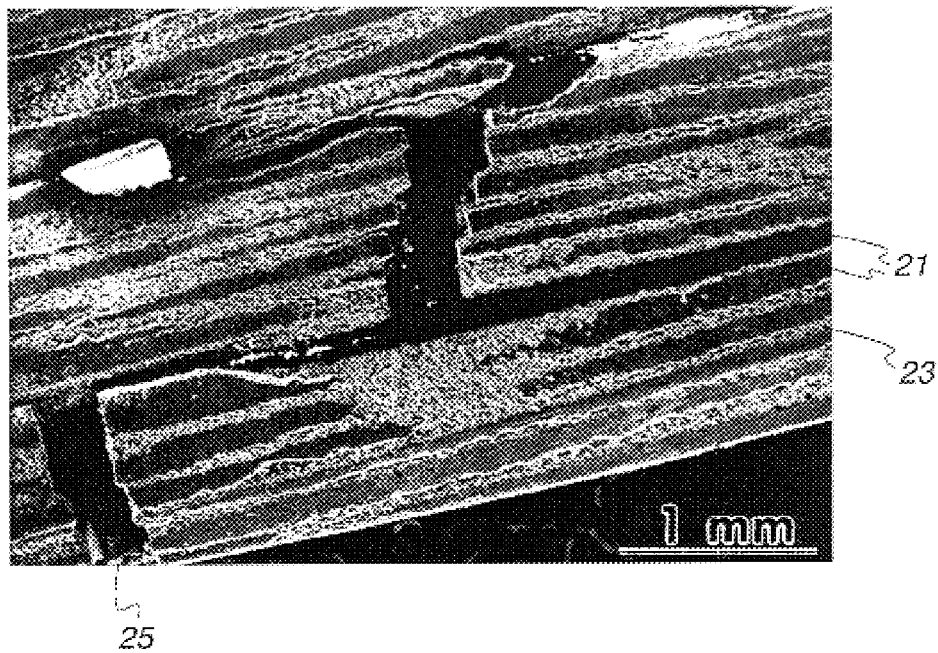
FIG. 6 is a photomicrograph depicting stress faults through the invented construct, in accordance with features of the present invention.

Scanning electron microscopy indicated that the unloading steps observed in the FM stress v. displacement curves were caused by energy-dissipating events such as crack delamination, crack deflection, and some cell pull-out. As depicted in FIG. 6, the inventors have found that primary cracks follow tortuous paths through the FM, making several 90 degree deviations through the cell-boundary phase 23 before continuing through the FM. Point 25 in FIG. 6 represents the fracture origin.

Strength of the resulting FMs is further enhanced if the individual filaments 22 are configured to shapes to facilitate dense packing of the filaments. As such, in some instances, round filaments are to be eschewed to prevent the formation of void space between laid up fibers. Rectangular or polygonal filaments instead are produced and juxtaposed to each other.

Alternatively, void space between juxtaposed round filaments are minimized if the round filaments are first flattened prior to firing (i.e., while the organics are still present in the filaments.) Flattening can be accomplished by pressing or rolling. Inasmuch as the flattening process causes the filaments to take on a rectangular configuration, void spaces are removed. The resultant sheets can then be readily stacked.

Particle Preparation Detail

A salient feature of the invented process is the production of FMs which are produced in situ from oxide powders. The graceful failure depicted by the invented FM is the result of tailoring particle sizes of the two constituents (i.e. the core or cell, and the sleeve or cell boundary phase). The inventors have found that the density and relative strength between the core and sleeve phases is controlled by controlling particle sizes. To create the necessary microstructure of the resulting fibrous monoliths, the inventors utilized milling and settling techniques to create well-controlled particle size distributions. Generally, particle sizes of the constituents comprising the core material are smaller than the particle sizes of the oxides comprising the sleeve material. Core particle sizes range from approximately 0.3 microns ($\mu$m) to 3 $\mu$m. The sleeve's oxide powders contain particle sizes ranging from 5 to 50 $\mu$m.

The powders of specific size become constituents in a first plastic formulation for the core extrusion process and a second plastic formulation for the sleeve extrusion process. Generally, each of the prepared powders were mixed with organics and vibratory milled for a time sufficient to create the desired particle sizes and dispersion. More detailed formulation details are provided in Example 1 below for $ZrSiO_4$ powders.

While the example contained herein deals with a $ZrSiO_4$ oxide, a myriad of oxides also are candidates for the plastic formulation process, including, but not limited to, $Al_2O_3$, mullite, yttrium aluminum garnet, or combinations thereof. Generally, materials exhibiting good high-temperature properties are suitable. Through doping and control of powder particle size, these materials are processed over a range of densities and strengths.

Reduction in the concentration of fine oxide powder in the cell boundaries further weaken the cell/boundary interface and promote additional delamination and deflection.

EXAMPLE 1

$ZrSiO_4$ powders were obtained from Alfa Aesar of Ward Hill, Mass., and Remet of Utica, N.Y. The Alfa Aesar powder was utilized for the dense cell (i.e. core) and the Remet powder was used for the porous cell boundary. Each of these powders was processed differently. The as-received Alfa Aesar powder had an average particle size of 1 $\mu$m. It was ball-milled in isopropyl alcohol with $ZrO_2$ milling media for 72 hours, then dried and screened through a 100-mesh (150 $\mu$m, or 0.0059 inches) sieve. The resulting particle size was 0.7 $\mu$m.

Remet flour-grade powder was first processed to remove the finest particles. Three Remet powders were classified by sedimentation once, twice or thrice, with the average particle sizes for each of powders being 13.5 microns, 22 microns and 29 microns, respectively. The principal difference between the three powders is the fraction of fines that remain after settling. Approximately 100 grams of the Remet $ZrSiO_4$ powder, having an initial particle size of 7 $\mu$m, was placed in a 1000 milliliter beaker with 800 milliliters of deionized water and 20 drops of a deflocculent (i.e., a dispersing agent.) Darvan C, available from R.T. Vanderbilt Company, Inc., or Norwalk, Conn. is a suitable deflocculent. The solution was mixed for approximately one minute and then allowed to stand for a time sufficient for the two phases to develop, which in this instance was approximately 3 minutes. The remaining solution was decanted and the settled material was retained. The settled powder had an average particle size of 13.5 microns.

After the $ZrSiO_4$ particles are sieved, their plastic processing begins.

In a first step of plastic processing, the necessary composition must be batched and then subjected to a vibratory or ball mill for a time sufficient to create an homogenous mixture. Table 1 shows the components and concentrations that were used in exemplary plastic mixes. Generally, the plastic mix constituents include the ceramic powders, a binder, a solvent, a plasticizer and a deflocculant. Generally, the binders serve to hold the particles together. A myriad of binders are commercially available and suitable for incorporation in the instant formulation. Suitable binders are medium to long-chain polymers with end functional groups. The ends attach to the powders and in so doing, provide a measure of strength to the mixture. At-51 Binder from Rohm & Haas, Philadelphia, Pa. is one such suitable binder.

Plasticizers are utilized in the mix so as to modify the structure of the binder to make the later more flexible. An exemplary binder is butyl benzyl phthalte, marketed as S-160 Plasticizer from Monsanto, Fayetteville, N.C. S-160 is a short-chained polymer.

Deflocculents prevent agglomeration of the powders by minimizing electrostatic attractions between the powders. Fish oil is a standard deflocculant, Solvent is utilized to provide homogeneity to the organic mix. It is the vehicle in which the organic constituents dissolve. As such, a myriad of solvents are suitable for the invented process. Xylene/butanol is an exemplary solvent.

Carbon powder is a constituent specific for the cell boundary slip. It serves to minimize the shrinkage differential between the cell phase and the boundary by leaving voids after burn off of the sleeve. The presence of the voids is short-lived inasmuch as the sleeve layer constituents cave in to fill the voids. The carbon also is used to differentiate the sleeve phase from the cell phase inasmuch as the ceramic powder is white and the carbon is black.

TABLE 1

Composition of plastic mixes used for extruding $ZrSiO_4$ filaments

| Constituent | Alfa Aesar $ZrSiO_4$ (g) | Remet $ZrSiO_4$ (g) |
|---|---|---|
| 78 wt % xylene/22 wt % butanol | 20 | 15 |
| Monsanto S-160 Plasticizer | 10 | 10 |
| Dilute fish oil in xylene/butanol | 10 | 10 |
| $ZrSiO_4$ powder | 200 | 200 |
| Rohm & Hass At-51 Binder | 21 | 21 |
| Carbon Powder | 0 | 0.25–5 |

After the mixes were milled overnight, they were de-aired, tape cast to a thickness of approximately 0.5 mm, substantially dried and stripped. The tapes were allowed to sit overnight and were then mixed in a Brabender high-shear mixer. Mixing was used to adjust viscosity to the necessary levels for co-extrusion. Inasmuch as not all solvent is removed during the drying process, the "dried" mixes retained some flowability. Essentially, the drying increases viscosity of the mix.

In the co-extrusion process, depicted in FIG. 1, two Brabender screw extruders were attached to the co-extrusion die 14. The Alfa Aesar plastic mix was introduced into the first entry port 16 (i.e., a first extruder hopper) of the die and the Remet plastic mix was fed into a second entry port 18 (i.e. second extruder hopper) of the die. The two separate plastic mixes were simultaneously forced into the extrusion die to produce an initial filament 22.

The filaments were cut into 10 centimeter sections and bundled, as depicted as element 24 in FIG. 3. The bundle was then placed in an extrusion die and extruded to produce a fibrous monolith filament 28.

The fibrous monolith was cut into 50 mm sections, stacked in a bar die, and pressed in a bar die at a pressure of approximately 100 MPa. The resultant bars were then heat treated. Binder burnout was accomplished in flowing $O_2$ or $N_2$. Binder can be burned out in any oxidizing or inert atmosphere. Each bar was heated to 140° C. at 50° C./hour and held for 0.1 hours. After the hold, each bar was heated to 500° C. at 5° C./hour, held for 3 to 6 hours, and then cooled to room temperature at 50° C./hour. The bars were sintered in air at 1550° C. for 3 hours to complete the processing of the $ZrSiO_4$ FMs.

Figure 5:
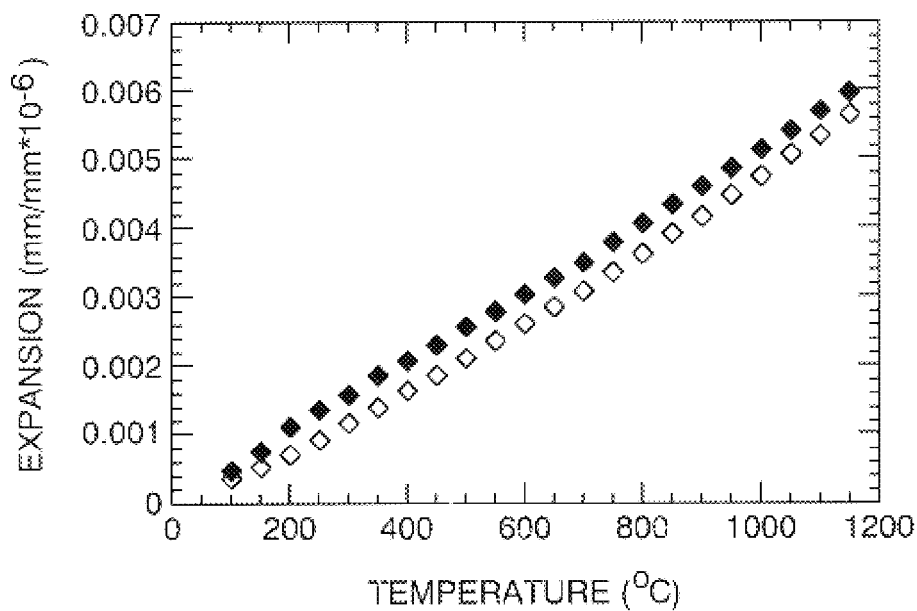
FIG. 5 is a thermal expansion curve for the $ZrSiO_4$ constituents in a duplex filament, in accordance with features of the present invention.

Thermal expansion curves for 95 percent dense $ZrSiO_4$ (i.e., the core material) and 70 percent dense $ZrSiO_4$ (i.e., the sleeve material) are depicted in FIG. 5. These expansions are close enough such that thermal-expansion mismatch will not cause significant cracking of the FM. The FM bars exhibited a 23 volume percent shrinkage between initial pressing and the fired state.

The FM bars were approximately 70 volume percent cell (i.e., core) and 30 volume percent cell boundary (i.e., sleeve). This is lower than the ratio of 85 vol. percent cell and 15 vol. percent cell boundary generally observed for $Si_3N_4$/BN FMs. The average cell size (i.e. core diameter) of the $ZrSiO_4$/$ZrSiO_4$ FMs was approximately 150 microns.

The samples were loaded in an Instron Model 4505 tester, available from Instron Corporation, Canton, Mass.

Scanning electron microscopy revealed a significant difference in shrinkage between the cell (i.e. core) and cell boundary (i.e., sleeve), with the cell shrinking more than the sleeve. This shrinkage will facilitate slippage at the interface between the two phases during a fracture. This, combined with a pull-out of individual cores, aid in dissipating energy.

The resulting FM product from the invented process confers several benefits, including being stable under oxidizing, inert and reducing atmospheres. Inasmuch as it consists of one constituent, it is inherently stable over time.

Aside from the production of two-phase FMs, the inventors also have developed a three-phase FM which contains a cell, an interphase, and a matrix. The cell and interphase are made by co-extrusion. The matrix is the effect of a bundling of various filaments. The matrix also can be produced via various infiltration techniques.

A feature of the three-phase FM is that the weakest phase in the structure is not continuous. In a construct where non-continuous phases are utilized, any crack is isolated to a cell or group of cells. In such non-continuous phase structures, crack delamination, especially from out-of-plane loading, occurs discreetly from one cell to the next with each interphase acting as a crack trap. This differs from a continuous phase system wherein energy (manifested as a crack or delamination) traverses the entire structure. Thus, the advantage of this non-continuous construct is that greater strength and fracture toughness result.

While the invention has been described with reference to details of the illustrated embodiments, these details are not intended to limit the scope of the invention as defined in the appended claims. For example, while only two extruder hoppers are depicted in the instant filament-production process, additional hoppers could be added "downstream" from the point where the first sleeve is first laid down. As such, these third or fourth layers are applied distal to the first sleeve hopper, relative to the injection port utilized by the core material. This will facilitate the production of multiplex filaments such as triplex and quadraplex filaments. A head-on view of such a resulting filament would resemble a tree-ring configuration wherein the layers are concentrically aligned and co-axial to each other.

Also, while neat formulations of $ZrSiO_4$ were utilized in the examples herein, the utilization of this oxide, as well as other oxides, containing dopant is within the scope of the instant teaching. The addition of dopants, such as yttrium oxide, boron oxide or boric acid, alkali metal hydroxides (such as sodium hydroxide), magnesium oxide, titanium dioxide and lead oxide further provide a wider range of densities for the core and cell boundary layers. Such dopants would be present in weight percents of approximately less than 2 weight percent.

The embodiment of the invention in which an exclusive property or privilege is claimed is defined as follows:

1. A method for producing composite ceramics, the method comprising:
   a) simultaneously forming a ceramic core coaxial with a ceramic sleeve at room temperature to create a fibrous monolith, wherein carbon powder is a constituent specific to the ceramic sleeve;
   b) burning off the carbon powder to leave voids in the ceramic sleeve; and
   c) allowing remaining constituents of the ceramic sleeve layer to cave into the voids.

2. The method as recited in claim 1 wherein the sleeve and the core are co-extruded.

3. The method as recited in claim 1 wherein the core and the sleeve are comprised of identical compounds.

4. The method as recited in claim 1 wherein the core and sleeve are comprised of compounds selected from the group consisting of $ZrSiO_4$, $Al_2O_3$, mullite, yttrium aluminum garnet, or combinations thereof.

5. The method as recited in claim 2 further comprising:
   a) forming material, comprising constituents of the core, into a first plastic mass;
   b) forming material comprising constituents of the sleeve into a second plastic mass;
   c) forcing the first plastic mass into a first entry port of a co-extrusion dye while simultaneously forcing the second plastic mass into a second entry port of the co-extrusion dye so as to produce a duplex filament wherein the core is coaxial to and surrounded by the sleeve;
   d) repeating steps a–c until a desired number of filaments are produced;
   e) subjecting the produced filaments to a ram extrusion process to produce a fibrous monolith;
   f) assembling the filaments into a predetermined shape; and
   g) sintering the assembled filaments.

6. The method as recited in claim 5 wherein the produced filaments are arranged parallel with each other prior to the ram extrusion process so as to produce a unidirectional fibrous monolith.

7. The method as recited in claim 5 wherein the produced filaments are arranged at various angles to each other to form a multidirectional fibrous monolith.

8. The method as recited in claim 5 wherein the first plastic material is formed by
   a) sizing compounds comprising the core to between 0.3 microns and 3 microns in diameter;
   b) mixing the sized compounds with plasticizer, solvent and binder so as to form a slurry; and
   c) homogenizing the slurry.

9. The method as recited in claim 5 wherein the second plastic material is formed by
   a) sizing compounds comprising the sleeve to between 5 and 50 microns in diameter;
   b) mixing the sized compounds with plasticizer, solvent, binder and carbon so as to form a slurry; and
   c) homogenizing the slurry.

10. The method as recited in claim 5 wherein the constituents of the core comprise particles having diameters of between 0.3 microns and 3 microns.

11. The method as recited in claim 5 wherein the constituents of the sleeve comprise particles having diameters of greater than 5 microns and less than 30 microns.

12. The method as recited in claim 1 wherein the core comprises particles and the sleeve comprises particles and wherein the particles of the core have a smaller diameter than the particles of the sleeve.

13. The method as recited in claim 5 wherein the filaments have a circular cross section.

14. The method as recited in claim 5 wherein the filaments have a rectangular cross section.

15. The method as recited in claim 6 wherein the filaments have a circular cross section and the filaments are flattened after being arranged, to a configuration sufficient to cause the cross section to approximate a rectangle.

16. The method as recited in claim 5 wherein a third plastic mass is applied to the sleeve at a first point distal from the second entry point so as to produce a second sleeve concentric with the core.

17. The method as recited in claim 16 wherein a fourth plastic mass is applied to the second sleeve at a second point distal from the first point.

* * * * *